(12) United States Patent
Hirsch

(10) Patent No.: US 10,324,755 B2
(45) Date of Patent: Jun. 18, 2019

(54) TASK SCHEDULING USING IMPROVED WEIGHTED ROUND ROBIN TECHNIQUES

(71) Applicant: International Business Machines Corporation, Armonk, NY (US)

(72) Inventor: Philip D. Hirsch, Erie, PA (US)

(73) Assignee: International Business Machines Corporation, Armonk, NY (US)

(*) Notice: Subject to any disclaimer, the term of this patent is extended or adjusted under 35 U.S.C. 154(b) by 427 days.

(21) Appl. No.: 15/286,680

(22) Filed: Oct. 6, 2016

(65) Prior Publication Data

US 2018/0101406 A1 Apr. 12, 2018

(51) Int. Cl.
G06F 9/48 (2006.01)

(52) U.S. Cl.
CPC .................... *G06F 9/4881* (2013.01)

(58) Field of Classification Search
CPC .................................................... G06F 9/4881
See application file for complete search history.

(56) References Cited

U.S. PATENT DOCUMENTS

| 6,438,135 | B1 | 8/2002 | Tzeng |
| 7,580,355 | B2 | 8/2009 | Zhao et al. |
| 2006/0098680 | A1 | 5/2006 | Kelesoglu et al. |

OTHER PUBLICATIONS

Weighted Round-Robin Scheduling, LVS Knowledge Base, http://kb.linuxvirtualserver.org/wiki/Weighted_Round-Robin_Scheduling, last modified Nov. 5, 2005, accessed online Aug. 31, 2016, 2 pages.

*Primary Examiner* — Charlie Sun
(74) *Attorney, Agent, or Firm* — Stephen J. Walder, Jr.; David B. Woycechowsky

(57) ABSTRACT

Mechanisms are provided for distributing work requests to worker devices. The mechanisms generate a cycle table data structure which segments a set of work request allocations into a plurality of cycles in which, for each cycle, a subset of worker devices, from a set of worker devices, are eligible to receive allocations of work requests. The mechanisms receive a work request from a computing device and select a worker device to receive the work request, from a first subset of worker devices that are eligible to receive allocations of work requests for a current cycle in the cycle table data structure, based on both of entries in the cycle table data structure corresponding to a current cycle, and execution of weighted round robin scheduling logic. The mechanisms distribute the work request to the selected worker device which performs an operation on the work request.

18 Claims, 4 Drawing Sheets

TASK SCHEDULING USING IMPROVED WEIGHTED ROUND ROBIN TECHNIQUES

BACKGROUND

The present application relates generally to an improved data processing apparatus and method and more specifically to mechanisms for providing task scheduling using improved weighted round robin techniques.

Scheduling of tasks is an important functionality to be performed in environments where a plurality of tasks are received for performance by a plurality of devices or individuals. The scheduling of the tasks allows for greater throughput, responsiveness, and overall performance. However, many known scheduling techniques suffer from significant drawbacks, not the least of which is the non-optimum distribution of the tasks to the entities, e.g., devices or individuals, which are to perform those tasks. Many times, known techniques overload some entities while leaving other entities relatively less loaded. Moreover, many techniques do not take into consideration the individual abilities of the entities to handle the tasks that are assigned to them.

One known scheduling technique is the weighted round robin scheduling algorithm. The weighted round robin scheduling algorithm is designed to better handle distributing tasks to entities with different performance capabilities, as opposed to round robin scheduling which assumes that all entities have the same performance capabilities. For example, with regard to an environment in which tasks are distributed to server computing devices, the weighted round robin scheduling algorithm is designed to better handle distributing tasks to servers with different processing capacities. In some known implementations of the weighted round robin scheduling algorithm, each server is assigned a weight value (sometimes herein more simply referred to as a "weight"), which is an integer value that is correlated (at some level of granularity) the processing power and/or capability of the server (herein sometimes referred to as "processing capacity" of the computer or processor(s) set). Servers with higher processing capacity, and thus higher weights than other servers, receive new tasks prior to those that have relatively lower weights. Servers with higher weights tend to get more tasks than those with relatively lower weights (although task size may also impact whether a given task will go to a high-weight or low-weight server). Servers with equal weights to get an equal number of tasks (at least under an assumption of roughly uniform task size). Basic round robin scheduling can be considered a special instance of weighted round robin scheduling where all the weights are the same and thus, all of the servers are considered to have the same processing capability.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system specifically configured with logic for implementing the method, the method being for distributing work requests to worker devices. The method comprises generating, by the data processing system, a cycle table data structure. The cycle table data structure segments a set of work request allocations into a plurality of cycles in which, for each cycle, a subset of worker devices, from a set of worker devices, are eligible to receive allocations of work requests. The method further comprises receiving, by the data processing system, a work request from a computing device and selecting, by the data processing system, a worker device to receive the work request, from a first subset of worker devices that are eligible to receive allocations of work requests for a current cycle in the cycle table data structure, based on both of entries in the cycle table data structure corresponding to a current cycle, and execution of weighted round robin scheduling logic. The method also comprises distributing, by the data processing system, the work request to the selected worker device. The worker device performs an operation on the work request.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
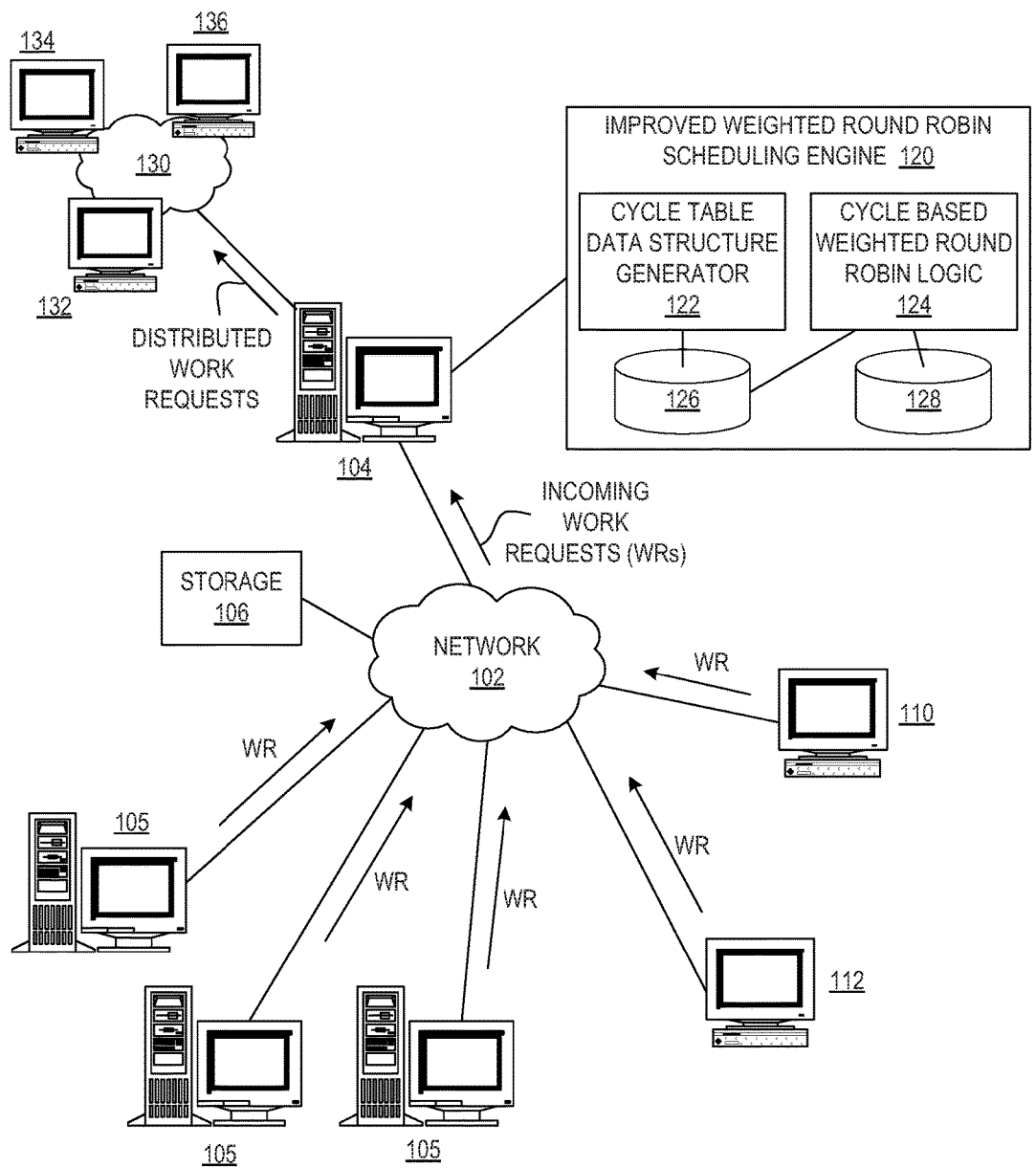
FIG. 1 is an example diagram of a distributed data processing system in which aspects of the illustrative embodiments may be implemented.

The illustrative embodiments provide mechanisms for providing task scheduling using improved weighted round robin techniques. The improved weighted round robin technique utilizes a cycle table data structure or cycle array function that evenly distributes the selection of weight values for which tasks may be assigned. During a cycle, only those entities having weights whose values in the cycle table data structure, or generated by the cycle array function, indicate that tasks may be assigned to that entity, are assigned a task. The cycle table data structure or cycle array function serves to avoid oversaturating entities having higher weights while leaving other entities relatively ignored during early allocations of tasks and the opposite effect at later allocations of tasks. Thus, a more balanced distribution of tasks to entities using weighted round robin techniques is achieved.

In other words, tasks are distributed to the entities according to their relative abilities to perform work as opposed to priorities associated with the tasks themselves. In some illustrative embodiments, the tasks are assumed to have no difference in priority, i.e. all tasks are assumed to have the same priority, and thus, the differentiating factor that determines where the tasks are assigned is the relative ability of the entities, or workers, to perform work. This differs from other scheduling or distribution mechanisms which assign tasks based on priority, or criticality, of the tasks themselves. However, it should be appreciated that the mechanisms of the illustrative embodiments may also operate in a hybrid manner with assignment being done both with regard to priority or criticality of the tasks themselves and based on the relative abilities or capacities of the entities to perform work on the tasks.

As noted above, the weighted round robin technique or algorithm assigns tasks to entities based on the relative weights associated with the entities that operate on the tasks, where the weights represent the relative strength of the capabilities of the entities to operate on the tasks. For example, assume that there is a stream of incoming work requests, work assignments, or tasks that are to be handled by multiple entities, e.g., servers, human workers, or any other entity that is able to perform an assigned task, where one or more of the entities may have differing capacity or capabilities to handle such work requests. For example, consider a pool of functionally equivalent web servers that could all potentially handle incoming HyperText Transfer Protocol (HTTP) requests, but some of the web servers are more powerful than others with regard to their processing capabilities, e.g., faster processors, multi-threaded processors, larger caches, larger memory resources, faster communication connections, etc. Alternatively, consider a pool of human support team members with a stream of incoming problem reports to be handled, where some support team members are capable of handling more requests per unit time than other support team members, e.g., because of their experience, their personal skill set, or the like. In either case, it is desirable to assign proportionally more requests to the more capable entities, or "workers", based on a set of "weights" that define each worker's relative capacity or capability to handle work. This is weighted round robin scheduling as described above.

Using a weighted round robin scheduling technique, suppose worker A, e.g., a server or other type of computing device, human being, or other entity type, has a weight of 10, worker B has a weight of 7, and worker C has a weight of 3, where the weights represent a relative capability or capacity for the worker to perform work on tasks assigned to the worker, e.g., worker A has a greater capacity/capability to handle tasks than worker B, which has a greater capacity/capability than worker C. This means that for every 20 incoming work requests or tasks (10+7+3=20), 10 of those work requests should be assigned to worker A, 7 should be assigned to worker B, and 3 should be assigned to worker C.

Because of the way in which weighted round robin scheduling operates, the set of 20 incoming work requests would be assigned to the workers as follows (where letters designate respective ones of workers A, B, and C): AAAABABABABABCABCABC. This pattern is obtained by assigning work requests first to worker A until its relative capability/capacity is less than worker B which has the second highest weight, at which point work requests are then assigned to the worker with the highest current capability/capacity, e.g., worker B, and this process is repeated iteratively.

While the weighted round robin scheduling technique achieves the required goal of providing the correct proportion of work requests to the right workers, the approach is not well balanced or equitable as the most capable worker, e.g., worker A in this example, is assigned 5 of the first 6 work requests, but only 2 of the last 8 work requests or tasks (hereafter simply referred to as tasks). Moreover, the least capable worker, e.g., worker C in this example, is assigned 3 of the last 7 tasks after being effectively ignored for the first 13 incoming tasks. Thus, the weighted round robin scheduling techniques operate well only if the worker weights are very similar to one another. The more variable the weights are relative to one another, the more unbalanced or "bursty" the allocation of tasks is using the weighted round robin scheduling technique.

The illustrative embodiments provide an improvement on the weighted round robin scheduling technique that utilizes a cycle array data structure, which may be a two dimensional cycle table data structure or cycle based function that generates the cycle array data values (herein referred to as a cycle array function), to split tasks into multiple cycles. In each cycle, some workers are eligible to be assigned tasks and some workers are not based on their corresponding weight values, where again the weight values are a relative measure of the capability or capacity of the worker to perform operations on tasks or otherwise perform work. The cycle table data structure/cycle array function provides essentially a two-dimensional Boolean table or array of size N×N, where N is the maximum weight actually assigned to workers under consideration, e.g., in the example above, the cycle table or array data structure, or equivalent cycle function, would provide a 10×10 table where each entry in the cycle table/array data structure is a true/false value indicating whether a particular corresponding worker is available during that cycle to accept assigned tasks.

The cycle table/array data structure, or cycle array function, (hereafter assumed to be a cycle table data structure for purposes of illustration) provides the N×N two dimensional array in which columns represent the different possible weight values that may be assigned to the workers, from weight 1 to the maximum weight of the workers that is actually assigned (e.g., in the above example, the maximum weight is 10), while the rows represent each cycle, where again the number of cycles (or rows) is equal to the maximum weight that is assigned to the workers. Each column X has exactly X "true" values with the remaining values being "false" values. The "true" values are positioned within each column so as to evenly distribute or spread the true values and false values within a column. Thus, for example, in a first column there would be one true value and that one true value would be positioned in a row that is approximately at the half way point between the first row and the final row of the column, e.g., if there are 5 rows, the "true" value would be positioned in the entry for row 3 in the column, thereby generating two chunks of "false" values, i.e. rows 1-2 and rows 4-5. In a second column, the column would have 2 "true" values positioned in the second and fourth rows of the column and the other entries for rows 1, 3, and 5 being "false". Similarly, in a fifth column, there would be 5 "true" values and thus, every entry in every row would have a "true" value.

Based on the cycle table data structure, as work assignments are received, the tasks are distributed to the workers in accordance with the weights associated with the workers, the current cycle (designating the row in the cycle table data structure to use), and the "true"/"false" values present in the row of the cycle table data structure corresponding to the current cycle. Only those workers who have a weight value that has a corresponding "true" value in the current cycle (and corresponding row) of the cycle table data structure are assigned tasks for that cycle. Because the "true" values for each weight in the cycle table data structure are evenly distributed in the column, and thus amongst the cycles or rows, then for each cycle, tasks are allocated to workers in a more balanced manner.

For each value of N, the table is "constant" so it can be generated dynamically, i.e. the cycle table data structure need not be stored as a persistent data structure in-between task assignments. Alternatively, the cycle table data structure may be persisted in-between task assignments since the size of the cycle table data structure is relatively small in size due to the values in the cells of the table/array being Boolean values, e.g., a 10×10 table or array would require only 100 bits of storage and even a 100×100 table/array would require only 1.25 KB of storage. There are two persistent portions of state information that are retained between task assignments, the first is the current cycle number and the second is the index of the last worker who was assigned a task. The current cycle number is used to identify which row in the cycle table data structure is currently active with regard to allocation of tasks to workers or entities. The index of the last worker that was assigned a task indicates which "true" value in a row to select next for allocation of a task, e.g., in a row (or cycle) of the cycle table data structure where there are three "true" values present, the last worker index indicates which of these "true" values have already been selected in the current cycle for allocation of a task such that the next "true" value may be selected for allocation of the next task. In contrast, weighted round robin scheduling techniques rely on a single piece of persistent information, i.e. the index of the last assigned worker, and do not utilize a cycle table data structure or cycle based function as in the present illustrative embodiments.

In addition to the cycle table data structure, or cycle array function in some illustrative embodiments, the illustrative embodiments also maintain a worker weight data structure that indicates the assignment of weights to different workers. Based on the cycle table data structure entries for the current cycle, and the weights assigned to workers as determined from this worker weight table data structure, a set of workers to which tasks are to be assigned may be identified. Tasks may then be assigned to the workers in the set of workers based on the relative weights assigned to the workers, using the index of the last worker as a mechanism for identifying which worker should be next to receive a task, until each worker is assigned a task at which point the cycle is incremented (N+1), or wrapped to the first cycle if the current cycle is the last cycle (N). Thus, for each cycle, only those workers having weights for which a "true" value is present in the cycle table data structure are assigned tasks.

With the improved weighted round robin scheduling techniques of the illustrative embodiments, a smoother assignment of tasks to workers is achieved that provides a more balanced assignment. For example, in the above example of 20 incoming tasks to be handled by workers A, B, and C, the improved weighted round robin scheduling technique of the illustrative embodiments achieves an assignment of tasks as follows: BACABABACABACABA-BABA. Thus, as a result, the most capable worker A is assigned every second request and the remainder are allocated to B and C in a less "clumping" manner, e.g., rather than assigning 5 of the first 6 tasks to worker A, they are distributed over all of the workers, and instead of assigning only 2 of the last 8 tasks to worker A, they are again distributed over all of the workers in proportion to their weights. The net result is potentially improved utilization of the worker resources in cases where the workers have significantly different capability/capacity since the incoming task load is assigned in a smoother and more balanced manner amongst the workers without changing the total number of tasks that are assigned to each worker.

The improved weighted round robin scheduling technique may be implemented as software logic executed by a processor or other computing device hardware configured with specific software instructions that are executed to implement the improved weighted round robin scheduling technique. Moreover, the improved weighted round robin scheduling technique may be implemented in specially configured electronic hardware logic of a computing device that is specifically designed and arranged to perform the operations described herein. Furthermore, in some illustrative embodiments, a combination of software logic and specialized hardware logic may be utilized without departing from the spirit and scope of the present invention.

The improved weighted round robin scheduling technique may be implemented in a single computing device or a plurality of computing devices. The computing devices may be any computing device that processes data corresponding to work requests, where the work requests identify any type of work that needs to be performed by a worker, connections with other devices to be established, distribution of information for processing, or other useful work. It should be appreciated that the term "work request" may correspond to a single task or multiple tasks. For ease of explanation, it is assumed herein that a "work request" corresponds to a single task and thus, the term "work request" and "task" are used synonymously. However, in some illustrative embodiments, the work request may encompass multiple tasks in which case a work request may be divided into its individual tasks which may then be distributed to each of the workers using the mechanisms of the illustrative embodiments. Moreover, in some illustrative embodiments, the entire work request may be sent to a worker in accordance with the illustrative embodiments, such that the worker would the perform all of the multiple tasks associated with the work request.

A worker may be a human being, a physical or virtual computing device, a communication device, a piece of machinery, or any other entity that can perform the requested work. For example, the work requests may represent calls coming into a distributed call center where the calls are distributed to human or automated agents that handle the communication with the caller. In other embodiments, the work request may be a request to perform processing on a portion of data. In other embodiments, the work request may be a request to establish a connection with a server pool, access a pool of data storage, interact with one or more computing devices, such as a webserver pool that handle requests via the Internet to process requests for accessing information or performing other useful work, and/or the like. In still further embodiments, the workers may be software application instances executing on one or more computing devices to which the work request is directed by virtue of the improved weighted round robin scheduling.

Other examples may include other scheduling or distributing of tasks to humans via their associated computing devices, automated computing devices themselves and/or software application instances executing on such computing devices, or electronic equipment capable of receiving work requests, and the like. The number of possible implementations of the improved weighted round robin scheduling logic of the illustrative embodiments is too numerous to set forth herein. The illustrative embodiments set forth herein are intended to encompass any computing device based implementation of the improved weighted round robin scheduling in which work requests, or individual tasks of work requests, are distributed to workers.

In some embodiments, the improved weighted round robin scheduling technique may be implemented in an individual processor of a computing device, a plurality of processors of the same or different computing devices, or the like. The workers to which the work requests or tasks are distributed may be physical or virtual workers. For example, the worker may be a physical processor, a core of a processor, a physical computing device comprising one or more processors, or a set of computing devices. In other embodiments, the worker may be a virtual processor, virtual machine, a logical system comprising a plurality of physical systems, logical disk or other virtualized data storage comprising a plurality of physical storage devices, or the like.

Regardless of the particular implementation, the mechanisms of the illustrative embodiments serve to improve the operation of weighted round robin scheduling techniques by more smoothly, and in a more balanced manner, scheduling or allocating tasks to workers in accordance with their associated weights than previously available with known weighted round robin techniques. The mechanisms of the illustrative embodiments achieve the desired goal of having more capable workers be assigned a larger proportion of the incoming work requests or tasks, but does so in a manner that does not overburden the workers in a "bursty" manner, as previously described above. Moreover, as noted above, the illustrative embodiments distribute work requests or tasks to workers in accordance with their relative abilities to perform work as opposed to priorities associated with the work requests or tasks themselves, although in some illustrative embodiments a hybrid approach is also possible.

Before continuing the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages, scripting language, such as UNIX or other operating system shells, UNIX awk scripting language, JavaScript, or the like. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
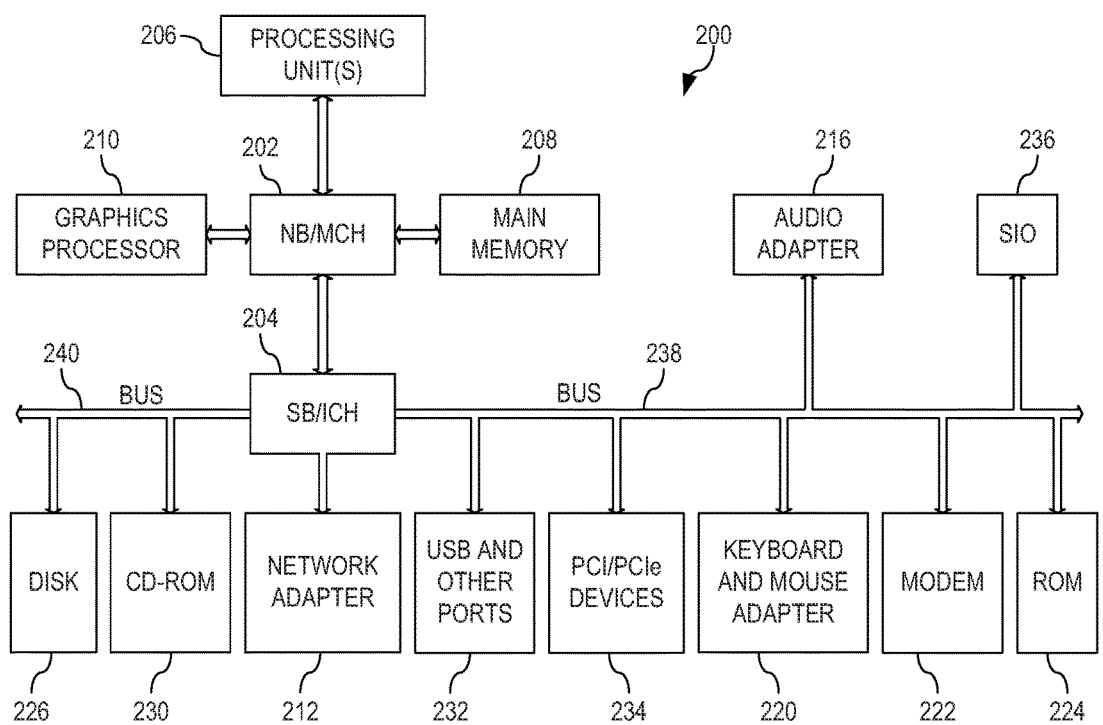
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wired connections, wireless communication links, fiber optic cables, and the like.

In the depicted example, server 104 and servers 105 are connected to network 102 along with storage unit 106. In addition, clients 110 and 112 are also connected to network 102. These clients 110 and 112 may be, for example, personal computers, network computers, or the like. In the depicted example, servers 104 and 105 may provide data, access to application instances, boot files, operating system images, and the like, to the clients 110 and 112. Clients 110 and 112 are clients to servers 104 and 105 in the depicted example. Moreover, servers 104 and 105 may be clients to one another or may be part of a collection of servers, such as a server pool or server farm. As such, various ones of servers 104 and 105 may operate as a client or co-worker and may send work requests (WRs), as a requestor, to other servers 104 and 105 which process the work requests and return result data to the requestor. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an improved weighted round robin scheduling engine 120 for use in scheduling task allocations to a plurality of processors, application instances, blades, or other "workers" associated with the server 104. For example, in the depicted implementation, the server 104 may be a computing device configured to distribute incoming calls to a call center 130 which comprises a plurality of operator terminals 132-136 for handling such calls, and where each operator may have their own relative capabilities represented by weight values. In another implementation, the server 104 may be a computing device configured to distribute incoming work requests (WRs) to corresponding application instances executing on a computing cluster 130 comprising a plurality of computing devices 132-136. In other implementations, the server 104 may be a server in a pool of servers 104 and 105 configured to handle work requests from client computing devices, such as clients 110-112, via network 102. In some implementations, the server 104 may be a computing device configured to distribute jobs to equipment capable of performing such jobs, e.g., printing equipment, manufacturing equipment, or the like. Various possible implementations of work requests and workers are available with a common characteristic being a computing device, e.g., server 104 in the depicted example, which is configured with logic for implementing the improved weighted round robin scheduling engine 120 of the illustrative embodiments.

It should be noted that while a server 104 computing device is used as an example in FIG. 1 as the mechanism for implementing the improved weighted round robin engine 120, the illustrative embodiments are not limited to such. Rather, in other illustrative embodiments, less complex electronic devices with computing capabilities may be utilized, such as routers, switches, or any other electronic device capable of being configured with logic (software executed on hardware, application specific hardware, or a combination) for implementing the improved weighted round robin engine 120 to distribute work to workers.

The configuring of the computing device, router, switch, or the like, may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates improved weighted round robin scheduling of work requests or tasks with regard to a plurality of workers, e.g., computing devices, human beings, equipment, or the like.

The improved weighted round robin scheduling engine 120 provides the logic for distributing or scheduling work requests to workers based on a cycle table data structure or cycle array function (hereafter assumed to be a cycle table data structure for ease of explanation). The improved weighted round robin scheduling engine 120 comprises a cycle table data structure generator 122, which in some embodiments may instead provide a cycle array function that is implemented to generate values corresponding to entries in a cycle array that is equivalent to the cycle table data structure as discussed hereafter, and cycle based weighted round robin logic 124 which implements logic that utilizes the cycle table data structure to apply a weighted round robin scheduling algorithm to incoming work requests.

The cycle table data structure generator 122 generates a cycle table data structure in accordance with the illustrative embodiments, based on a designation of a maximum weight value that is assigned to workers with which the improved weighted round robin schedule engine 120 operates. This maximum weight value may be specified in a configuration parameter of the improved weighted round robin scheduling engine 120 and provided to the cycle table data structure generator 122 for example. The maximum weight value may be a maximum value of a weighting scale being used in the implementation or may be the actual maximum weight value actually assigned to a worker. For example, the weighting scale may range from weight values of 1 to 10, however there maximum weight value actually assigned to any one worker may be 8 in which case, in one embodiment, the maximum weight value communicated to the improved weighted round robin scheduling engine 120 may be 8 rather than 10. Alternatively, the maximum weight value of the scale may be utilized, i.e. 10 in this example, in some illustrative embodiments.

The cycle table data structure generator 122 determines the maximum weight value, either from configuration information or otherwise communicated to the improved weighted round robin scheduling engine 120, and generates the cycle table data structure 126 as a two dimensional array of Boolean values having dimensions N×N, where N is the maximum weight value. The cycle table data structure 126 is constructed one column at a time from column 1 to column N. A column X, where X ranges from 1 to N, is constructed so as to have a number of entries with Boolean "true" values, e.g., a Boolean value of "1", equal to the column number X with the remainder of the entries being set to a Boolean value of "false," e.g., a value of "0." The "true" values are spread out in the column as evenly as possible. An example of a cycle table data structure 126 generated using this methodology is shown in FIG. 3.

The example cycle table data structure 300, which may be used as cycle table data structure 126 generated by cycle table data structure generator 122, is generated for an N value of 5 and thus, has five columns 310 and five rows 320. The columns 310 correspond to different possible integer weight values that may be assigned to workers from a minimum value, e.g., 1 in this example, to the maximum value, e.g., 5 in this example. The rows 320 correspond to separate cycles of work request or task allocations. That is, the cycle table data structure 300 separates the allocation of work requests or tasks into separate cycles where some workers are permitted to receive work requests or tasks while others are not. The number of cycles that the allocation is separated into is greater than or equal to the maximum weight value for the workers, e.g., for a highest worker weight of 5, then the cycle table data structure 300 is at least of size 5×5 but the cycle table data structure 300 may be larger, such as in the case of pre-built table data structures that represent a maximum weight of a range, even though the maximum weight assigned to workers is less than that maximum weight of the range (this allows for pre-built table data structures that do not need to be re-built with each new maximum weight assignment to the workers).

Figures 3, 4:
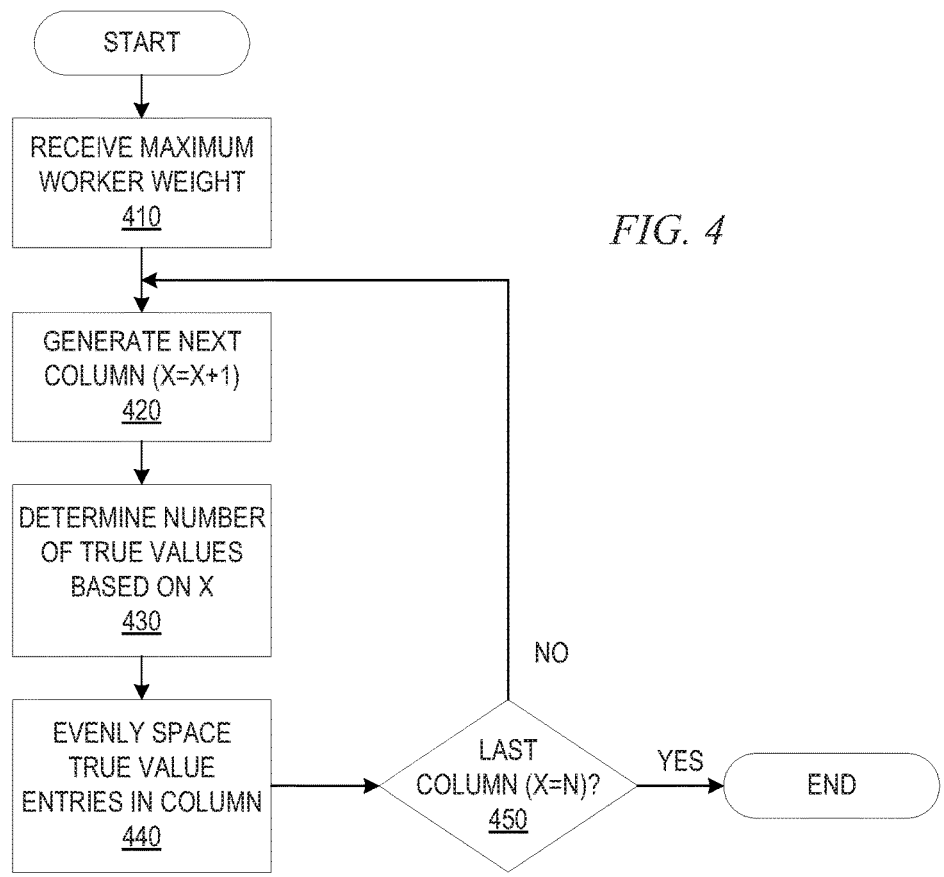
FIG. 3 is an example diagram of a cycle table data structure in accordance with one illustrative embodiment.
FIG. 4 is an example flowchart outlining an operation for generating a cycle table data structure in accordance with one illustrative embodiment.

As shown in FIG. 3, and noted above, each column X from 1 to 5 has a corresponding number of "true" values positioned in entries such that the "true" values are as evenly spread as possible within the column. Thus, in the depicted example of FIG. 3, taking column 1 as an example, column 1 corresponds to weight value 1 and has a single "true" value. The "true" values of a column are positioned at entries in the column that separate the column into nearly equal size chunks. Thus, column 1 is separated into two chunks 312 and 314 of "false" values separated by the "true" entry 316. The other columns 310 follow the same construction methodology such that column 2 has 2 "true" values and 3 "false" values, column 3 has 3 "true" values and 2 "false" values, etc., where the "true" values are spread evenly within the corresponding column.

Returning to FIG. 1, the cycle table data structure generator 122 generates the cycle table data structure 126 for the designated maximum weight value. Alternatively, in some embodiments where cycle table data structures are stored in-between allocation requirements, a corresponding previously generated cycle table data structure 126 may be retrieved from a storage (not shown) having one or more cycle table data structures stored for one or more maximum weight values. Whether generated dynamically or retrieved from storage, the cycle table data structure 126 is provided to the cycle based weighted round robin logic 124.

The cycle based weighted round robin logic 124 operates on work requests (WR) or tasks submitted to the server 104, such as from one or more of the servers 105 or client computing devices 110-112 via network 102, that are to be scheduled or distributed to workers. In the depicted example, the workers are the computing device terminals 132-136 of the call center 130, however as noted above the workers may be any human being, computing device, piece of equipment, application instance, or other physical or virtual entity capable of performing work. While the depicted example shows separate computing devices as being the workers, as noted above, the scheduling may occur completely within a single computing device so as to distribute work requests or tasks to different processors of the same computing device, different application instances, different virtual machines, or the like.

As work requests or tasks are received by the server 104, the cycle based weighted round robin logic 124 utilizes the cycle table data structure 126 to determine, using a weighted round robin approach, which workers are eligible for accepting an allocation of the work request and selecting a worker, e.g., one of computing device terminals 132-136, to send the work request to. In order to determine which worker to send the work request to, the cycle based weighted round robin logic maintains a current cycle index value C and last worker index W. The cycle index value is incremented, and wrapped back to the minimum value, each time all workers having weights whose entries in the cycle table data structure have a "true" value have been assigned a work request, e.g., when the last worker index W points to a last worker in the set of workers that have "true" values in the current cycle. The last worker index value W stores the identifier of the last worker that received a work request which is used to distinguish between multiple potential recipients of work requests within a cycle, e.g., if workers A, B, and C all may receive work requests during the current cycle, and the last worker to receive a work request was worker A, then the next work request may be assigned to worker B.

Thus, for example, as noted above, a worker weight data structure 128 may be maintained in association with the cycle based weighted round robin logic 124 and indicates the weight values associated with the workers with which the improved weighted round robin scheduling engine 120 operates. This worker weight data structure 128 may have the weight values for the various workers populated through a configuration process, through manual setting of the weight values by a system administrator initially and/or dynamically, through an automated system that evaluates the operation of the workers and automatically sets the weight values based on results of such evaluations, or the like. Based on the current cycle, the weight columns for which there are "true" values in the row corresponding to the current cycle are used to perform a lookup of workers in the worker weight data structure 128 having weights that correspond to the weight values of columns for which there is a "true" value in the current cycle row. In this way, a set of workers to which work requests may be distributed or scheduled during the current cycle is identified. Work requests may then be assigned to the workers until each worker has been assigned a work request, such as in an ordered manner from highest weight to lowest weight or vice versa, updating index of the last worker with each assignment of a work request. Once all workers in the set of workers for the current cycle have received a work request, the cycle index is updated to point to the next cycle, and thus, the next row in the cycle table data structure, or to wrap around to the first cycle. When the cycle index is updated, the index of the last worker assigned a work request is also initialized to an initial value. The process is then repeated for the next set of work requests.

It should be appreciated that multiple workers may have the same weight value. The index of the last worker to receive a work request is used to keep track of which workers have been assigned a work request so that workers are not assigned multiple work requests in the same cycle and other workers are not inadvertently skipped. Thus, each worker in cycle C that has a same weight value corresponding to a "true" value in the cycle table data structure 126 will receive a work request in the current cycle C. Once all workers of a particular weight value, whose entry for the current cycle C has a "true" value, are assigned a work request, the operation proceeds to the next column having a true value in the current cycle C where all workers having that weight value for the next column are assigned work requests, and so on. Once the current cycle is completed, the cycle index value C is incremented and the process is repeated. Thus, both the current cycle index C and the last worker index W are wrapped such that repeated application of the cycle table data structure may be applied to the cycle based weighted round robin technique.

Thus, using the example cycle table data structure 300 in FIG. 3, as an example assume that there is a series of 8 work requests received by server 104 and that workers 132, 134, and 136 are being utilized by server 104 to handle work requests. Assume that worker 132 (referred to hereafter as worker "A") has a weight of 5, worker 134 (referred to hereafter as worker "B") has a weight of 2, and worker 136 (referred to hereafter as worker "C") has a weight of 1. Each set of 8 incoming work requests is assigned to the workers A-C in accordance with their weights and the cycle table data structure 300 as follows:

1. The operation starts in row 1 corresponding to cycle number 1. As shown in cycle table data structure 300, only workers with weights 3, 4, or 5 are assigned a work request or task and thus, only worker A is assigned a work request in cycle 1 since worker A has a weight of 5 and no other workers have a weight of 3 or 4.
2. In the next cycle, i.e. cycle number 2, workers with weight values of 2, 4, and 5 are assigned work requests; so the next incoming work requests are assigned to worker B (having weight 2) and then worker A (having weight 5). A work request is assigned to worker B first and then worker A because the last worker index value W indicates worker A to have received the last work request from step 1 above.
3. In cycle 3, workers with weights 1, 3, and 5 are assigned work requests; so the next incoming work requests are assigned to worker C and then worker A since worker C has a weight of 1 and worker A has a weight of 5. Again, worker C is assigned a work request first prior to worker A because the last worker index value W indicates worker B to have received the last work request from step 2 above.
4. In cycle 4, worker B and worker A are assigned tasks based on the "true" values associated with their weights in row 4 of the cycle table data structure 300.
5. In cycle 5, only worker A is assigned a work request as only worker A has a matching weight value corresponding to a "true" value in the cycle table data structure 300.
6. After cycle 5, the operation returns to cycle 1 and the process is repeated.

Thus, using the example cycle table data structure 300, and the example workers A-C with the above example weight values, a sequence of work request allocations or assignments is generated having the pattern ABACABAA for a set of 8 work requests. For comparison, using a weighted round robin scheduling approach that does not include the improvements provided by way of the cycle table data structure 126, one would obtain an allocation or assignment pattern of AAAABABC. Thus, the mechanisms of the illustrative embodiments provide for a more balanced approach to scheduling or distributing work requests to workers such that the more heavily weighted workers are not subjected to "bursty" work request allocations or assignments.

As noted above, in some illustrative embodiments, rather than having to generate a cycle table data structure 126, or retrieving a previously generated cycle table data structure 126 from a storage for the specific maximum weight value being utilized with the workers, the illustrative embodiments may implement a function that generates a "true" or "false" value indicating the value within the two dimensional cycle table or array without having to construct and store the entire cycle table or array. For example, a function f(r, c, N) may be provided in which r designates the row (or cycle), c designates the column (or weight), and N designates the cycle table or cycle array size, and f(r, c, N) returns a Boolean value of "true" or "false". By implementing the cycle array function f(r, c, N), for example, the storage required to store the cycle table data structure may be saved which may be of consideration in implementations where the improved weighted round robin scheduling engine 120 is implemented in a router, switch, or other computing device with limited storage capabilities. However, as noted above, the size of the storage required to store the entire cycle table data structure is relatively small in relation to modern storage capacities and thus, generating and storing the entire cycle table data structure will generally not be of a concern or burdensome use of storage resources.

To further illustrate the operation of an improved weighted round robin scheduling engine in accordance with one illustrative embodiment, consider the following pseudo-code that illustrates one implementation:

A. Initialize the worker weight data structure to associate weight values with workers;
B. Build/Retrieve the cycle table data structure (a NxN array of Boolean values where N is at least the highest weight value in the worker weight data structure);
C. Set integer cycleNumber = 1;
D. Set integer lastAssignedWorker = 0;
E. Start Listening for incoming work requests;
F. For each new incoming work request:
   a. Increment lastAssignedWorker;
   b. If (lastAssignedWorker<=number of rows in the worker weight data structure) then goto (c);
     Otherwise:
      i. Increment cycleNumber
      ii. If (cycleNumber> Number of rows in the cycle table data structure), then set cycleNumber=1;

```
    iii. Set lastAssignedWorker = 0;
    iv. Goto (a);
  c. Set x = (value in cycle table row = cycleNumber and column =
     worker[lastAssignedWorker].weight);
  d. If (x is true) then:
     i. Notify worker of assigned work request (e.g., send email to
        human, route the work request to the server or application,
        etc.);
     ii. Go back to (F);
  e. Otherwise, go back to (a).
```

Thus, in each cycle the pseudocode walks through the worker weight array in the worker weight data structure and assigns work requests or tasks to the workers whose weights correspond to "true" values for this cycle. When the end of the worker array is reached, the pseudocode determines that work requests have been assigned to all workers that should receive a work request in the current cycle and then the operation moves to the next cycle. The operation then repeats again with the beginning of the worker array.

As mentioned above, one feature of the illustrative embodiments is that work requests or tasks are assigned to workers based on their relative capabilities or capacities to perform work, as is indicated by the associated weight values assigned to the workers. This is significantly different from other mechanisms that operate based on priorities assigned to the work requests themselves. That is, assigning priorities to work requests or tasks does not solve the problems of distribution of work requests across all of the workers in a more balanced manner and, in fact, the same "bursty" assignment of work requests as discussed above may still be present even if different priorities are assigned to work requests, e.g., within a certain period all work request may have a similar priority and thus, the same effect as discussed above with weighted round robin scheduling may be encountered such that the more heavily weighted workers are assigned work requests before assigning work requests to less heavily weighted workers.

While the illustrative embodiments operate with regard to weight values assigned to workers based on their relative capabilities and/or capacities to handle work requests, the illustrative embodiments are not limited to such. Rather, in some illustrative embodiments, this mechanism may be combined with priorities associated with the work requests as well. Thus, for example, the work requests that have higher priorities may be distributed across the workers in accordance with the cycle table data structure and weights of workers in the manner described above with subsequent iterations being performed with regard to lower priority work requests. Thus, the higher priority work requests may be allocated prior to the lower priority work requests even though the work requests are still distributed in a balanced manner across all workers in accordance with their weights.

Moreover, in other illustrative embodiments, the priority values associated with the work requests may be used to dynamically modify the weight values associated with workers who have above a predetermined threshold weight value so as to redirect more of the higher priority work requests to the workers that have greater capabilities or capacities to perform work while lower priority work requests are directed to lower weighted workers. The work requests themselves are still distributed in the manner described above with the higher weighted workers being assigned more work requests and the lower weighted workers being assigned less work requests, but in a smoother or more balanced manner. However, of the work requests that are assigned to the more heavily weighted workers, the majority will be higher prioritized work requests, while for the workers that have lower weight values, the majority of work requests will have relatively lower priorities. Any methodology, technique, or algorithm that combines prioritized work requests with the capability/capacity based weighing of workers using the cycle table data structure or cycle array function mechanisms of the illustrative embodiments is intended to be within the spirit and scope of the present invention.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

With reference now to FIG. 2, data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein. In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described herein above with regard to the improved weighted round robin scheduling engine 120.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 4 is an example flowchart outlining an operation for generating a cycle table data structure in accordance with one illustrative embodiment. The operation outlined in FIG. 4 may be implemented, for example, by the cycle table data structure generator 122 of FIG. 1 to generate the cycle table data structure 126.

As shown in FIG. 4, the operation starts by receiving, such as by way of a configuration parameter retrieved from a configuration data structure or communicated to the cycle table data structure generator as part of an initialization operation, the maximum weight value N assigned to workers (step 410). A next column (X=X+1, where X is the column index value and has a maximum value of N) of the cycle table data structure is generated having N row entries (step 420). The index X of the column is used to determine the number of Boolean "true" values to include in the row entries of the column (step 430). The "true" values are evenly spaced in entries between row 1 and row N and the corresponding entries are set to the Boolean "true" value and other entries are set to Boolean "false" values (step 440). A determination is made as to whether X=N, i.e. the last column has been generated for the cycle table data structure (step 450). If not, the operation returns to step 420 for the next column. Otherwise, if X=N, then the cycle table data structure generation is complete and the operation terminates.

Figure 5:
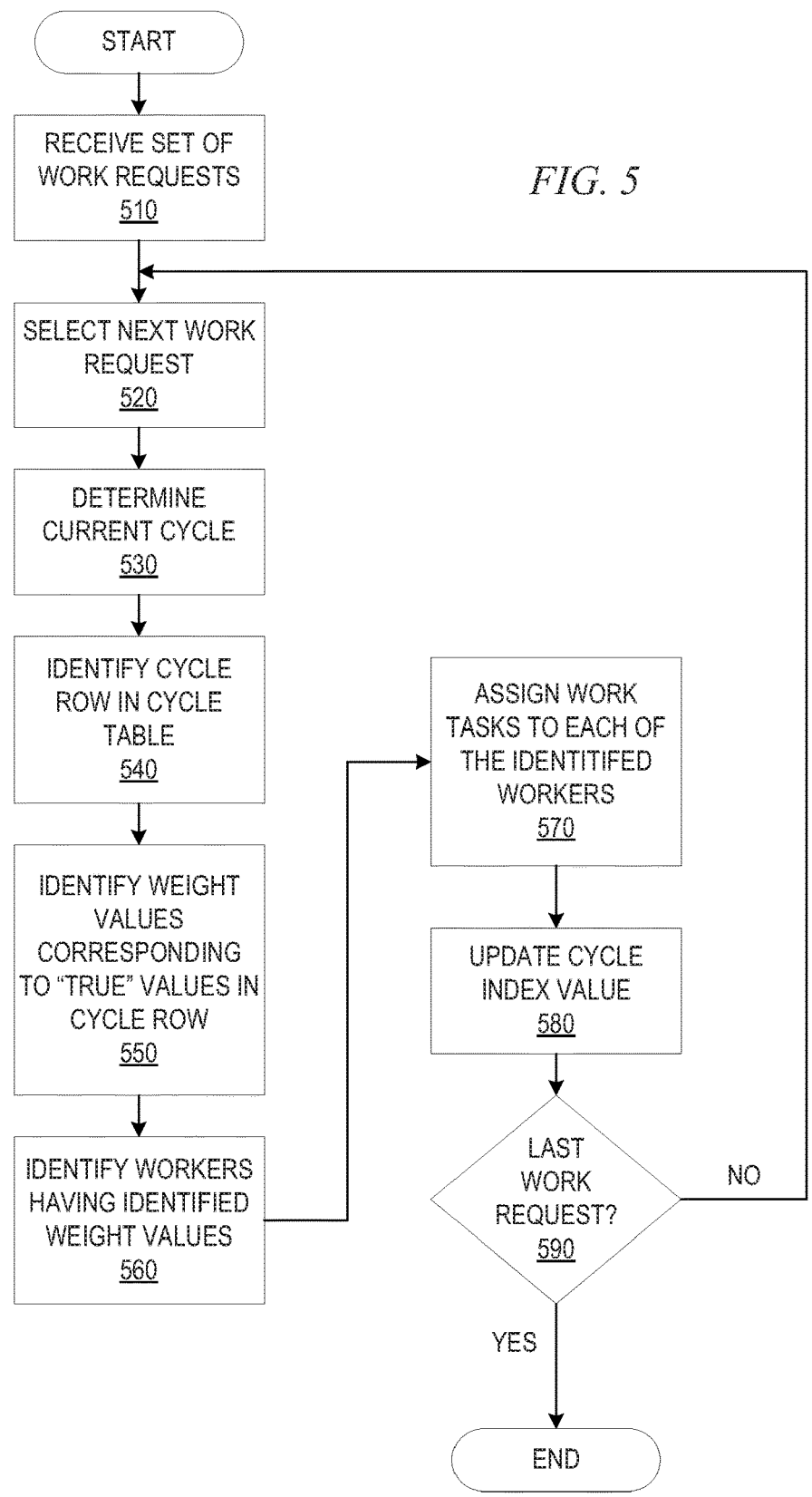
FIG. 5 is an example flowchart outlining an example operation for performing a cycle based weighted round robin scheduling using a cycle table data structure in accordance with one illustrative embodiment.

FIG. 5 is an example flowchart outlining an example operation for performing a cycle based weighted round robin scheduling using a cycle table data structure in accordance with one illustrative embodiment. The operation outlined in FIG. 5 may be implemented, for example, by the cycle based weighted round robin logic 124 in FIG. 1 based on the generated cycle table data structure 126.

As shown in FIG. 5, the operation starts by receiving a set of work requests for allocation to workers (step 510). A next work request in the set of work requests is selected for distribution to a worker (step 520) and the current cycle is determined based on the current cycle index value (step 530). Based on the current cycle index value, a corresponding row in the cycle table data structure is identified (step 540) and the weight values corresponding to the Boolean "true" values are identified (step 550). The workers having weight values corresponding to the Boolean "true" values of the current cycle (row in the cycle table data structure) are identified, such as by correlating the information from the cycle table data structure with a worker weight data structure or the like (step 560). Work tasks are assigned to each of the identified workers, i.e. those having "true" values for the current cycle, using the last worker index value W to track the assignment of work tasks (step 570). That is, based on the setting of the last worker index value W, a next worker is selected, from among the workers having weight values corresponding to the "true" values in the present cycle (row), and the worker index value W is updated. This process is iterated until all workers having "true" values in the present cycle have been assigned a work task. The cycle index value is then updated (step 580) and a determination is made as to whether all work requests have been assigned to workers (step 590). If not, the operation returns to step 520. Otherwise, the operation terminates for this set of work requests but may be repeated for subsequent sets of work requests that may be received.

Thus, the illustrative embodiments provide mechanisms for improving the operation of weighted round robin scheduling by providing a cycle table data structure or cycle array function that distributes the work request allocation over the workers in a more balanced manner than traditional weighted round robin scheduling techniques. The mechanisms of the illustrative embodiments thus, provide a more optimized utilization of resources based on their relative capabilities or capacities to perform work without having to accommodate bursty allocations to workers based on their relative strengths/weaknesses.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system specifically configured with logic for implementing the method, the method being for distributing work requests to worker devices and comprising:

generating, by the data processing system, a cycle table data structure wherein the cycle table data structure segments a set of work request allocations into a plurality of cycles in which, for each cycle, a subset of worker devices, from a set of worker devices, are eligible to receive allocations of work requests;

receiving, by the data processing system, a work request from a computing device;

selecting, by the data processing system, a worker device to receive the work request, from a first subset of worker devices that are eligible to receive allocations of work requests for a current cycle in the cycle table data structure, based on both of entries in the cycle table data structure corresponding to a current cycle, and execution of weighted round robin scheduling logic; and distributing, by the data processing system, the work request to the selected worker device, wherein the worker device performs an operation on the work request.

2. The method of claim 1, further comprising:

maintaining, by the data processing system, a current cycle index value indicating a current cycle for allocating work requests to worker devices; and maintaining, by the data processing system, a last worker index value indicating the identity of a last worker device, in the set of worker devices, to which a work request was allocated, wherein selecting a worker device to receive the work request comprises selecting the worker device based on the last worker index value and values in entries of the cycle table data structure corresponding to the current cycle index value.

3. The method of claim 2, wherein selecting the worker device based on the last worker index value and values of the current cycle index value comprises:

identifying a row of the cycle table data structure corresponding to the current cycle index value;

identifying the subset of worker devices as worker devices associated with weight values for which corresponding entries in the identified row of the cycle table data structure are set to an allocation value indicating eligibility to receive allocations of work requests; and selecting a next worker device, in the subset of worker devices, that is after a worker device indicated by the last worker index value, in a sequential order, as the selected worker device.

4. The method of claim 1, wherein each cycle, in the plurality of cycles, has a different associated subset of worker devices that are eligible to receive work requests, during that cycle, than is associated with other cycles in the plurality of cycles of the cycle table data structure.

5. The method of claim 1, wherein the cycle table data structure comprises columns corresponding to weight values associated with zero or more worker devices in the set of worker devices, and rows corresponding to individual cycles in the plurality of cycles, and wherein worker devices, in the subset of worker devices, for a cycle in the plurality of cycles, are indicated in the cycle table data structure as being eligible for receiving allocations of work requests by a specified value in columns corresponding to weight values assigned to worker devices in the subset of worker devices.

6. The method of claim 5, wherein the cycle table data structure comprises a number of columns equal to or exceeding a maximum weight value assigned to the set of worker devices.

7. The method of claim 6, wherein the cycle table data structure comprises a number of rows equal to or exceeding the maximum weight value assigned to the set of work devices.

8. The method of claim 5, wherein, for each column in the cycle table data structure, a number of entries in the column having allocation values that indicate eligibility to be allocated work requests is equal to a corresponding column number in the cycle table data structure for the column.

9. The method of claim 8, wherein, for each column in the cycle table data structure, the entries having allocation values that indicate eligibility to allocate work requests are distributed amongst the entries for the column as evenly as possible given the number of entries.

10. The method of claim 1, wherein the worker devices are one of a data processing system that executes an operation on work requests allocated to the worker device, or a computing device associated with a human being that performs an operation based on the work request.

11. A computer program product comprising a computer readable storage medium having a computer readable program stored therein, wherein the computer readable program, when executed on a computing device, causes the computing device to:
generate a cycle table data structure wherein the cycle table data structure segments a set of work request allocations into a plurality of cycles in which, for each cycle, a subset of worker devices, from a set of worker devices, are eligible to receive allocations of work requests;
receive a work request from a computing device;
select a worker device to receive the work request, from a first subset of worker devices that are eligible to receive allocations of work requests for a current cycle in the cycle table data structure, based on both of entries in the cycle table data structure corresponding to a current cycle, and execution of weighted round robin scheduling logic; and
distribute the work request to the selected worker device, wherein the worker device performs an operation on the work request.

12. The computer program product of claim 11, wherein the computer readable program further causes the computing device to:
maintain a current cycle index value indicating a current cycle for allocating work requests to worker devices; and
maintain a last worker index value indicating the identity of a last worker device, in the set of worker devices, to which a work request was allocated, wherein selecting a worker device to receive the work request comprises selecting the worker device based on the last worker index value and values in entries of the cycle table data structure corresponding to the current cycle index value.

13. The computer program product of claim 12, wherein the computer readable program further causes the computing device to select the worker device based on the last worker index value and values of the current cycle index value at least by:
identifying a row of the cycle table data structure corresponding to the current cycle index value;
identifying the subset of worker devices as worker devices associated with weight values for which corresponding entries in the identified row of the cycle table data structure are set to an allocation value indicating eligibility to receive allocations of work requests; and
selecting a next worker device, in the subset of worker devices, that is after a worker device indicated by the last worker index value, in a sequential order, as the selected worker device.

14. The computer program product of claim 11, wherein each cycle, in the plurality of cycles, has a different associated subset of worker devices that are eligible to receive work requests, during that cycle, than is associated with other cycles in the plurality of cycles of the cycle table data structure.

15. The computer program product of claim 11, wherein the cycle table data structure comprises columns corresponding to weight values associated with zero or more worker devices in the set of worker devices, and rows corresponding to individual cycles in the plurality of cycles, and wherein worker devices, in the subset of worker devices, for a cycle in the plurality of cycles, are indicated in the cycle table data structure as being eligible for receiving allocations of work requests by a specified value in columns corresponding to weight values assigned to worker devices in the subset of worker devices.

16. The computer program product of claim 15, wherein the cycle table data structure comprises a number of columns equal to or exceeding a maximum weight value assigned to the set of worker devices.

17. The computer program product of claim 16, wherein the cycle table data structure comprises a number of rows equal to or exceeding the maximum weight value assigned to the set of work devices.

18. The computer program product of claim 11 further comprising:
the computing device, wherein the computer program product is in the form of a computer system.

* * * * *